(12) United States Patent
Fu

(10) Patent No.: US 12,289,756 B2
(45) Date of Patent: Apr. 29, 2025

(54) DATA TRANSMISSION METHOD AND APPARATUS, TERMINAL DEVICE, AND STORAGE MEDIUM

(71) Applicant: GUANGDONG OPPO MOBILE TELECOMMUNICATIONS CORP., LTD., Dongguan (CN)

(72) Inventor: Zhe Fu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 393 days.

(21) Appl. No.: 17/884,864

(22) Filed: Aug. 10, 2022

(65) Prior Publication Data
US 2022/0386326 A1    Dec. 1, 2022

Related U.S. Application Data

(63) Continuation of application No. PCT/CN2020/083914, filed on Apr. 9, 2020.

(51) Int. Cl.
*H04W 72/566* (2023.01)
*H04W 72/12* (2023.01)
*H04W 72/23* (2023.01)

(52) U.S. Cl.
CPC ......... *H04W 72/569* (2023.01); *H04W 72/12* (2013.01); *H04W 72/23* (2023.01)

(58) Field of Classification Search
None
See application file for complete search history.

(56) References Cited

U.S. PATENT DOCUMENTS

2017/0150501 A1*   5/2017   Park ................. H04W 72/0446
2021/0084674 A1*   3/2021   Wei ....................... H04L 1/1864
(Continued)

FOREIGN PATENT DOCUMENTS

CN    106162911 A    11/2016
CN    109314614 A    2/2019
(Continued)

OTHER PUBLICATIONS

International Search Report and Written Opinion dated Jan. 11, 2021 in International Application No. PCT/CN2020/083914. English translation attached.

(Continued)

*Primary Examiner* — Tejis Daya
(74) *Attorney, Agent, or Firm* — Sheppard, Mullin, Richter & Hampton LLP

(57) ABSTRACT

The present disclosure relates to the field of wireless communication, and discloses a data transmission method and apparatus, a terminal device, and a storage medium. The method is applied in a terminal device including a Medium Access Control (MAC) layer and a physical layer. The method includes: delivering, by the physical layer, indication information to the MAC layer; adjusting, by the MAC layer based on the indication information, a priority of data at the MAC layer from prioritized to de-prioritized; and re-transmitting the data; or adjusting, by the MAC layer based on the indication information, a priority of a Scheduling Request (SR) at the MAC layer from prioritized to de-prioritized; and re-transmitting the SR.

14 Claims, 8 Drawing Sheets

(56) References Cited

U.S. PATENT DOCUMENTS

| | | | | |
|---|---|---|---|---|
| 2021/0144751 | A1* | 5/2021 | Joseph | H04W 72/115 |
| 2021/0307057 | A1* | 9/2021 | Baek | H04W 76/27 |
| 2021/0385796 | A1* | 12/2021 | Shi | H04W 72/23 |
| 2022/0279541 | A1* | 9/2022 | Kim | H04W 72/21 |

FOREIGN PATENT DOCUMENTS

| | | |
|---|---|---|
| CN | 110677872 A | 1/2020 |
| CN | 110831062 A | 2/2020 |

OTHER PUBLICATIONS

Interdigital."Intra UE Prioritization between SR and PUSCH", 3GPP RAN WG2 Meeting #106 R2-1906409, May 3, 2019(May 3, 2019), line 10 of p. 1-last line of p. 3.

Nokia et al. "Handling of De-prioritized Uplink Transmission", 3GPP TSG-RAN WG2 Meeting #106 R2-1906188, May 2, 2019(May 2, 2019), line 1 of p. 2-last line.

Nokia et al. "On Autonomous Transmission of Pending MAC PDUs", 3GPP TSG-RAN WG2 Meeting #108 R2-1915490, Nov. 7, 2019 (Nov. 7, 2019), the entire document.

Samsung. "Report of [Offline-036][IIOT] Data Data and Data SR Prioritization", 3GPP TSG-RAN2 Meeting #109-e R2-20XXXXX, Mar. 3, 2020(Mar. 3, 2020), the entire document.

Extended European Search Report dated Dec. 6, 2022 received in European Patent Application No. EP20930213.2.

Ericsson :"Handling of de-prioritized MACPDUs",3GPP Draft ;R2-1912554 Handling of De-Prioritized MAC PDUs ,3rd Generation Partnership PROJECT(3GPP) , Mobile Competence Centre ; 650, Route Des Lucioles ; F-06921 Sophia-Antipolis Cedex; France,vol. RAN WG2, No. Chongqing, China,Oct. 14, 2019-Oct. 18, 2019,Oct. 3, 2019(Oct. 3, 2019) ,XP051790595.

Institute for Information Industry(III) :Handling of De-prioritized MAC PDUs ,3GPP Draft;R2-1913084_Handling of De-Prioritized MAC PDUs ,3rd Generation Partnership PROJECT(3GPP) , Mobile Competence Centre ;650,RouteDes Lucioles ; F-06921 Sophia-Antipolis Cedex; France,vol. RAN WG2, No. Chongqing, China;Oct. 14, 2019-Oct. 18, 2019,Oct. 4, 2019(Oct. 4, 2019) , XP051791101.

Sony :"How to handle the deprioritized PDU for uplink Intra-UE prioritization",3GPP Draft; R2-1915228,3rdGenerationPartnership Project(3GPP) , Mobile Competence Centre ;650,Route Des Lucioles ;F-06921Sophia-Antipolis Cedex,France;vol. RAN WG2, No. Reno, USA;Nov. 18, 2019-Nov. 22, 2019,Nov. 7, 2019(Nov. 7, 2019) ,XP051815839.

Ericsson :"Main functions of intra-UE data-data prioriti zation" ,3GPP Draft;R2-1 909373 Main Functions of Intra-UE Data-Data Prioriti zation ,3rdGeneration Partnership Project(3GPP) ,Mobile Competence Centre ; 650,RouteDesLucioles ; F-06921 Sophia-Antipolis CED.vol. RAN WG2, No. Prague, Czech;Aug. 26, 2019-Aug. 30, 2019, Aug. 15, 2019(Aug. 15, 2019) ,XP051767173.

Communication pursuant to Article 94(3) EPC for European Application 20930213.2 mailed Aug. 28, 2023.

Communication pursuant to Article 94(3) EPC for European application 20930213.2 mailed Jan. 22, 2024.

The First Office Action from corresponding Chinese Application No. CN202211386922.1, dated Apr. 25, 2024. English translation attached.

Samsung,"Report of [Offline-036][IIOT] Data Data and Data SR prioritization" R2-2002190 , 3GPP tsg_ran\wg2_r12, tsgr2_109_e, Mar. 4, 2020.

Communication pursuant to Article 94(3) EPC for European application 20930213.2 mailed Jul. 3, 2024.

The Second Office Action from corresponding Chinese Application No. 202211386922.1 dated Jul. 16, 2024.

The Third Office Action from corresponding Chinese Application No. 202211386922.1 dated Sep. 18, 2024.

* cited by examiner

DATA TRANSMISSION METHOD AND APPARATUS, TERMINAL DEVICE, AND STORAGE MEDIUM

CROSS-REFERENCE TO RELATED APPLICATION

The present application is a continuation of International Patent Application No. PCT/CN2020/083914, filed on Apr. 9, 2020, the entire disclosure of which is hereby incorporated by reference in its entirety.

TECHNICAL FIELD

The present disclosure relates to the field of wireless communication, and more particularly, to a data transmission method and apparatus, a terminal device, and a storage medium.

BACKGROUND

To resolve transmission conflicts, a network device allocates a logical channel priority and a physical layer priority (or Layer 1 priority) to all logical channels configured by a terminal device.

The logical channel priority is mainly used at a Medium Access Control (MAC) layer to determine a behavior at the MAC layer when processing a MAC Protocol Data Unit (PDU), e.g., when time frequency positions of time frequency resources configured by Uplink (UL) grants for two MAC PDUs overlap with each other, whether the MAC layer needs to deliver any of the two MAC PDUs to the physical layer. When the MAC layer needs to deliver one of the two MAC PDUs, the one MAC PDU is determined as a prioritized MAC PDU; otherwise the one MAC PDU is determined as a de-prioritized MAC PDU. The physical layer priority determines a behavior at a physical layer, e.g., when time frequency positions of two MAC PDUs overlap with each other, whether the physical layer transmits any of the two MAC PDUs. When the physical layer transmits one of the two MAC PDUs, the one MAC PDU is determined as a prioritized MAC PDU; otherwise the one MAC PDU is determined as a de-prioritized MAC PDU. In the physical layer, when Dynamic Grants (DGs) or Configured Grants (CGs) corresponding to two MAC PDUs have a same physical layer priority, transmission of the MAC PDU corresponding to the DG is prioritized. Therefore, the MAC PDU piggybacked on the DG is determined as a prioritized MAC PDU, and the MAC PDU piggybacked on the CG is determined as a de-prioritized MAC PDU.

In a case where the MAC layer and the physical layer have inconsistent prioritizations, it is possible that a prioritized MAC PDU determined by the MAC layer may be determined as a de-prioritized MAC PDU by the physical layer. Since the MAC PDU is not actually transmitted, but the MAC layer deems that the terminal device has transmitted the MAC PDU, subsequent transmission of the MAC PDU may become problematic. For the above case, no good solution has been provided in the related art.

SUMMARY

Embodiments of the present disclosure provide a data transmission method and apparatus, a terminal device, and a storage medium, capable of allowing, based on indication information delivered from a physical layer to a MAC layer, data (or a Scheduling Request (SR)) that is not actually transmitted at the physical layer to be re-determined, by the MAC layer, as de-prioritized data (or a de-prioritized SR), so as to obtain a transmission opportunity for re-transmitting the data (or SR). The technical solutions are provided as follows.

According to an aspect of the present disclosure, a data transmission method is provided. The method is applied in a terminal device including a MAC layer and a physical layer. The method includes: delivering, by the physical layer, indication information to the MAC layer; adjusting, by the MAC layer based on the indication information, a priority of data at the MAC layer from prioritized to de-prioritized; and re-transmitting the data; or adjusting, by the MAC layer based on the indication information, a priority of an SR at the MAC layer from prioritized to de-prioritized; and re-transmitting the SR.

According to an aspect of the present disclosure, a data transmission method is provided. The method is applied in a network device. The method includes: receiving data transmitted by a terminal device; or receiving an SR transmitted by the terminal device. The terminal device includes a MAC layer and a physical layer. The data is transmitted by the MAC layer after adjusting, based on indication information, a priority of the data at the MAC layer from prioritized to de-prioritized. The SR is transmitted by the MAC layer after adjusting, based on the indication information, a priority of the SR at the MAC layer from prioritized to de-prioritized. The indication information is information delivered from the physical layer to the MAC layer.

According to an aspect of the present disclosure, a data transmission apparatus is provided. The apparatus includes a MAC layer module and a physical layer module. The physical layer module is configured to deliver indication information to the MAC layer module. The MAC layer module is configured to adjust, based on the indication information, a priority of data at the MAC layer module from prioritized to de-prioritized, and instruct the physical layer module to re-transmit the data; or the MAC layer module is configured to adjust, based on the indication information, a priority of an SR at the MAC layer module from prioritized to de-prioritized, and instruct the physical layer module to re-transmit the SR.

According to an aspect of the present disclosure, a data transmission apparatus is provided. The apparatus is applied in a network device and includes a transmission module. The transmission module is configured to: receive data transmitted by a terminal device; or receive an SR transmitted by the terminal device. The terminal device includes a MAC layer and a physical layer. The data is transmitted by the MAC layer after adjusting, based on indication information, a priority of the data at the MAC layer from prioritized to de-prioritized. The SR is transmitted by the MAC layer after adjusting, based on the indication information, a priority of the SR at the MAC layer from prioritized to de-prioritized. The indication information is information delivered from the physical layer to the MAC layer.

According to an aspect of the present disclosure, a terminal device is provided. The terminal device includes: a processor; a transceiver connected to the processor; and a memory configured to store instructions executable by the processor. The processor is configured to load and execute the executable instructions to implement the data transmission method according to any of the above aspects.

According to an aspect of the present disclosure, a network device is provided. The network device includes: a processor; a transceiver connected to the processor; and a memory configured to store instructions executable by the processor. The processor is configured to load and execute the executable instructions to implement the data transmission method according to any of the above aspects.

According to an aspect of the present disclosure, a computer-readable storage medium is provided. The computer-readable storage medium stores executable instructions. The executable instructions are loaded and executed by a processor to implement the data transmission method according to any of the above aspects.

The technical solutions provided by embodiments of the present disclosure can provide at least the following advantageous effects.

In a case that the MAC layer and the physical layer have inconsistent prioritizations, the indication information delivered from the physical layer to the MAC layer allows data (or an SR) that is not actually transmitted at the physical layer to be re-determined, by the MAC layer, as de-prioritized data (or a de-prioritized SR), so as to obtain a transmission opportunity for re-transmitting the data (or SR).

BRIEF DESCRIPTION OF DRAWINGS

In order to clearly explain technical solutions of embodiments of the present disclosure, drawings used in the description of the embodiments are briefly described below. Obviously, the drawings as described below are merely some embodiments of the present disclosure. Based on these drawings, other drawings can be obtained by those skilled in the art without creative effort.

DESCRIPTION OF EMBODIMENTS

Figure 1:
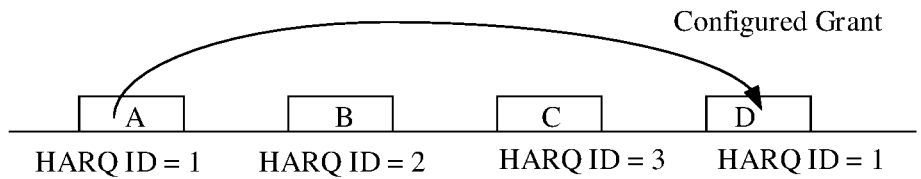
FIG. 1 is a schematic diagram showing a configured grant according to an exemplary embodiment of the present disclosure.

In order to make the objects, technical solutions, and advantages of the present disclosure more apparent, embodiments of the present disclosure will be described in detail below with reference to the accompanying drawings.

First, the terms used in the embodiments of the present disclosure will be briefly introduced.

UL grant: There are two types of UL grants, including dynamic grant and semi-persistent configured grant. That is, a network device can schedule a terminal for uplink transmission in two ways: dynamic scheduling and configured scheduling. For example, the network device may instruct the terminal to perform uplink data transmission by transmitting a dynamic UL grant or a configured UL grant.

Dynamic scheduling: The network device may transmit a UL grant to transmit control information on a Physical Downlink Control Channel (PDCCH), i.e., dynamic grant. The control information is scrambled with a terminal identifier. When successfully decoding the control information, the terminal device can obtain a size of a physical layer resource corresponding to the UL grant, a time/frequency domain distribution of the physical layer resource, and Hybrid Automatic Repeat reQuest (HARQ) information required for UL scheduled transmission. Therefore, the terminal device may perform an HARQ process to complete uplink transmission.

A processing method for dynamically scheduled data that is de-prioritized will be described below.

When a MAC PDU piggybacked on a dynamic grant is determined as de-prioritized by the MAC layer, the terminal device needs a new UL grant (dynamic grant) that is timely scheduled from the network device for the corresponding HARQ. The method used includes transmitting an SR and a Buffer States Report (BSR).

On the contrary, when the MAC PDU is determined as a prioritized MAC PDU by the MAC layer, the MAC layer deems that the MAC PDU has been transmitted by the terminal device, after which the terminal device descrambles PDCCH Downlink Control Information (DCI) indication with a Cell-Radio Network Temporary Identifier (C-RNTI) and receives, from the network device, feedback on the corresponding HARQ entity. When the DCI includes an Acknowledgement (ACK), the terminal device determines that the network device has correctly received the MAC PDU. When the DCI includes a Negative-Acknowledgment (NACK), the terminal device determines that the network device did not correctly receive the MAC PDU. Therefore, the terminal device may re-transmit the MAC PDU with a time frequency domain resource given in the DCI.

Configured scheduling: It is also be referred to as semi-persistent scheduling. The network device may pre-configure, by means of semi-persistent resource allocation, resources required by the terminal device for uplink transmission, i.e., configured grant. The configured grant may occur on a periodic basis, without the need for the terminal device to obtain an UL grant before each uplink transmission. For example, the network device may configure resource information for uplink transmission via Radio Resource Control (RRC) signaling, which may also include a period of the configured grant, such that the terminal device can perform the transmission on pre-configured resource scheduling. Such method may be Configured Grant Type 1. The network device may also configure, via the RRC signaling, partial information for uplink transmission, i.e., the period of the configured grant, and configure resource information for the uplink transmission and activate the resource for the uplink transmission via physical layer signaling, such that the terminal device can perform the transmission on the pre-configured resource scheduling. Such method may be Configured Grant Type 2.

A processing method configured scheduled data that is de-prioritized will be described below.

The MAC layer uses an autonomous transmission mechanism to transmit configured scheduled data that is de-prioritized. For example, when an UL grant A is determined as de-prioritized by the MAC layer, a MAC PDU corresponding to the UL grant A may wait until the arrival of a subsequent UL grant D having a same HARQ process number, and use the UL grant D for data transmission, as illustrated in FIG. 1.

On the contrary, when the MAC layer determines that the MAC PDU is a prioritized MAC PDU, the MAC layer deems that the terminal device has already transmitted the MAC PDU and therefore expects no feedback from the network device (correct transmission by default). When receiving from the network device DCI indication scrambled with a Configured Scheduling-Radio Network Temporary Identifier (CS-RNTI) (incorrect reception by the network device), the terminal device may re-transmit the prioritized MAC PDU.

In the related art, the following problems may exist when the MAC PDU corresponding to the UL grant determined as prioritized by the MAC layer is not finally transmitted by the terminal device.

For a semi-persistent configured grant, when it cannot be determined as a de-prioritized UL grant, the MAC layer cannot use autonomous transmission to transmit a MAC PDU stored in an HARQ buffer of an HARQ process corresponding to the UL grant.

For a dynamic UL grant, when it cannot be determined as a de-prioritized UL grant, the MAC layer cannot cause, by using an SR or a BSR, the network device to schedule a transmission resource for an HARQ process corresponding to the UL grant to perform data transmission, and thus the network device is unaware that the HARQ process has data that has not been transmitted. Therefore, a new transmission resource would be scheduled by using the DCI.

Figure 2:
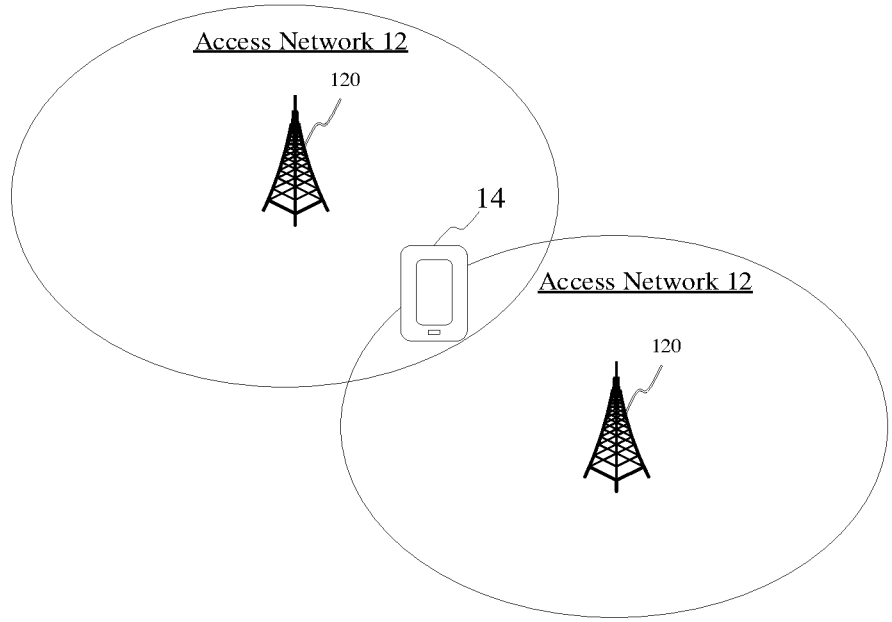
FIG. 2 is a block diagram showing a communication system according to an exemplary embodiment of the present disclosure.

FIG. 2 illustrates a block diagram showing a communication system according to an exemplary embodiment of the present disclosure. The communication system may include an access network 12 and a terminal device 14.

The access network 12 includes a number of network devices 120. The network device 120 may be a base station, which is an apparatus deployed in an access network to provide wireless communication functions for a terminal. The base station may include various forms such as macro base station, micro base station, relay station, access point and the like. In systems using different radio access technologies, a device serving as a base station may have different names. For example, in a Long Term Evolution (LTE) system, the device serving as a base station may be called Evolved Node B (eNodeB or eNB); and in a 5th Generation (5G) NR-U system, the device serving as a base station may be called gNodeB or gNB. As communication technology evolves, the name of "base station" may change. For the convenience of the embodiments of the present disclosure, the above-mentioned apparatuses configured to provide wireless communication functions for a terminal device 14 are collectively referred to as a network device.

The terminal device 14 may include various types of processing devices having wireless communication functions such as a handheld device, a vehicle-mounted device, a wearable device, a computing device, or another processing device that is connected to a wireless modem, various forms of user devices, a Mobile Station (MS), a terminal device, etc. For the convenience of description, the above-mentioned devices are collectively referred to as a terminal. The network device 120 and the terminal device 14 communicate with each other using a certain air interface technology, such as a Uu interface.

The technical solutions according to the embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, a LTE Time Division Duplex (TDD) system, an Advanced Long Term Evolution (LTE-A) system, a New Radio (NR) system, an evolution system of the NR system, an LTE-based access to unlicensed spectrum (LTE-U) system, a NR-based access to unlicensed spectrum (NR-U) system, a Universal Mobile Telecommunication System (UMTS), a Worldwide Interoperability for Microwave Access (WiMAX) communication system, a Wireless Local Area Network (WLAN), Wireless Fidelity (WiFi), a next-generation of communication system, or other communication systems, etc.

Generally speaking, conventional communication systems support a limited number of connections and are easy to implement. However, with the development of communication technologies, mobile communication systems will not only support conventional communication, but also will support, for example, Device to Device (D2D) communication, Machine to Machine (M2M) communication, Machine Type Communication (MTC), Vehicle to Vehicle (V2V) communication, and a Vehicle to everything (V2X) system etc. The embodiments of the present disclosure can also be applied to these communication systems.

Figure 3:
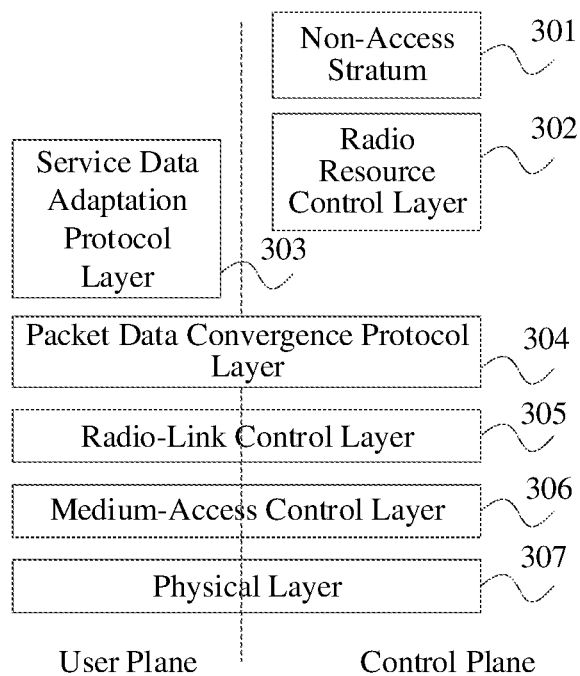
FIG. 3 is a schematic diagram showing a protocol stack for a terminal device according to an exemplary embodiment of the present disclosure.

FIG. 3 illustrates a schematic diagram showing a protocol stack for a terminal device according to an exemplary embodiment of the present disclosure. With reference to FIG. 3, the protocol stack for the terminal device includes: Non-Access Stratum (NAS) 301, Radio Resource Control (RRC) 302, Service Data Adaptation Protocol (SDAP) 303, Packet Data Convergence Protocol (PDCP) 304, Radio-Link Control (RLC) 305, Medium-Access Control (MAC) 306, and a Physical (PHY) layer 307.

The NAS 301 handles functions operating between the terminal device and the access network.

A control plane function of the RRC 302 is located between the RRC in the gNB and the terminal device. The RRC is responsible for handling control plane processes related to a Radio Access Network (RAN).

The SDAP 303 is responsible for mapping a Quality of Service (QoS) bearer to a radio bearer based on QoS requirements.

The PDCP 304 implements Internet Protocol (IP) header compression, encryption, and integrity protection, and also handles retransmission, in-order delivery, and duplicated data deletion during a handover. For a split bearer in dual connectivity, the PDCP can provide routing and replication. That is, one PDCP entity is configured for each radio bearer of the terminal device.

The RLC 305 is responsible for data segmentation and re-transmission and provides services for the PDCP in a form of RLC channels. Each RLC channel (corresponding to each radio bearer) is configured with one RLC entity for one terminal.

The MAC 306 is responsible for multiplexing of logical channels, HARQ retransmission, and scheduling of scheduling-related functions. A scheduling function for uplink and downlink resides in the gNB. The MAC provides services for the RLC in a form of logical channels.

The PHY layer 307 is responsible for encoding, decoding, modulation, demodulation, multi-antenna mapping, and other typical functions of the physical layer. The physical layer provides services for the MAC layer in a form of transport channels.

Figure 4:
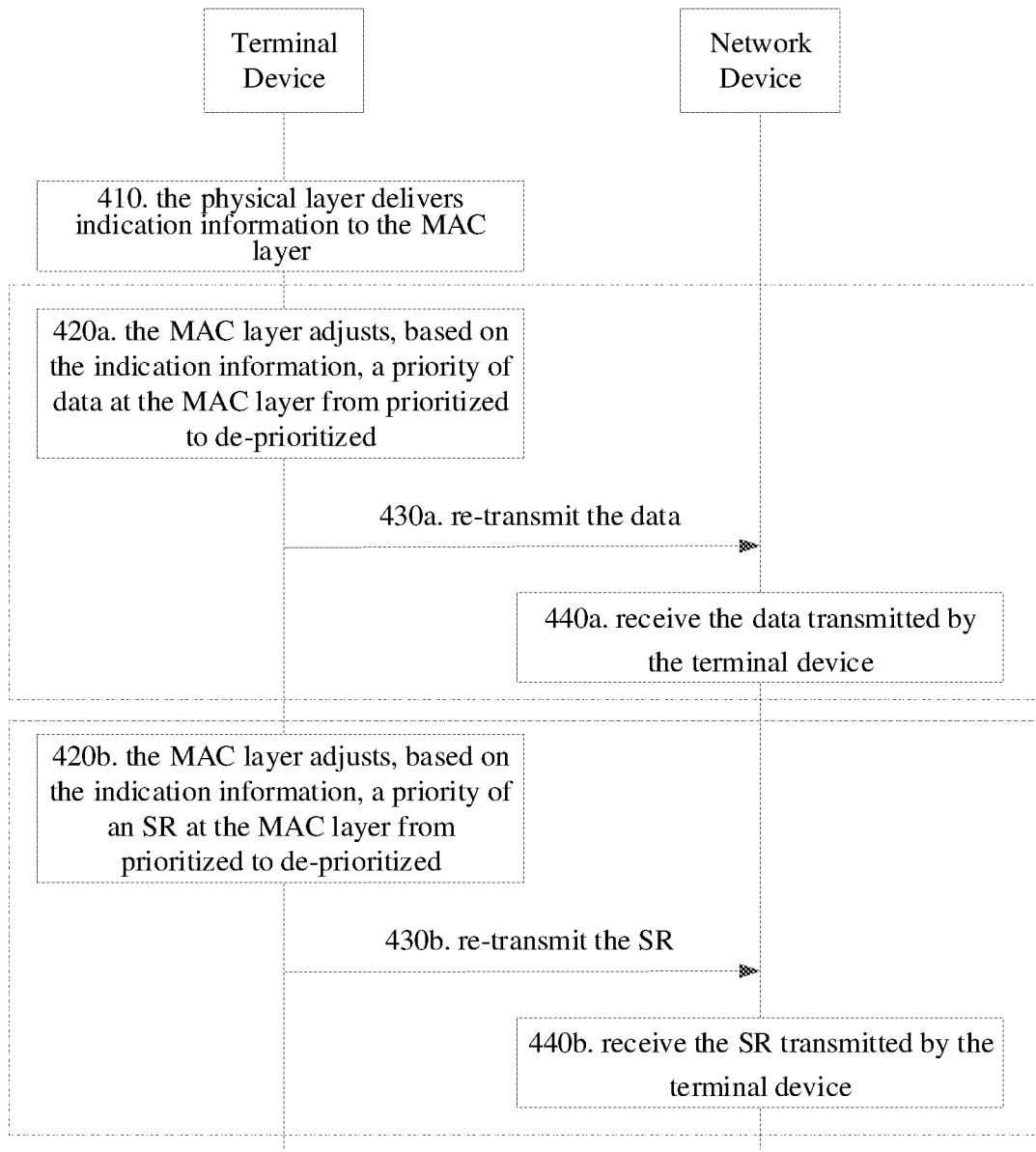
FIG. 4 is a flowchart illustrating a data transmission method according to an exemplary embodiment of the present disclosure.

FIG. 4 illustrates a flowchart illustrating a data transmission method according to an exemplary embodiment of the present disclosure. The method may be applied in the terminal device and the network device that are illustrated in FIG. 2. The terminal device includes a MAC layer and a physical layer. The method includes actions at blocks 410 to 440b.

At block 410, a physical layer delivers indication information to a MAC layer.

The indication information instructs the MAC layer to adjust a priority of data (or an SR).

The MAC layer is responsible for multiplexing a plurality of logical channels on a same transport channel. The physical layer is responsible for coding, physical layer HARQ processing, modulation, multi-antenna processing, mapping a signal to a physical time frequency resource corresponding to the signal, and mapping a transport channel to a physical channel.

Optionally, the physical layer delivers the indication information to the MAC layer when data (or an SR) determined by the MAC layer as prioritized is not transmitted.

Optionally, a priority of the MAC layer is a logical channel priority, which has 16 levels.

Figure 5:
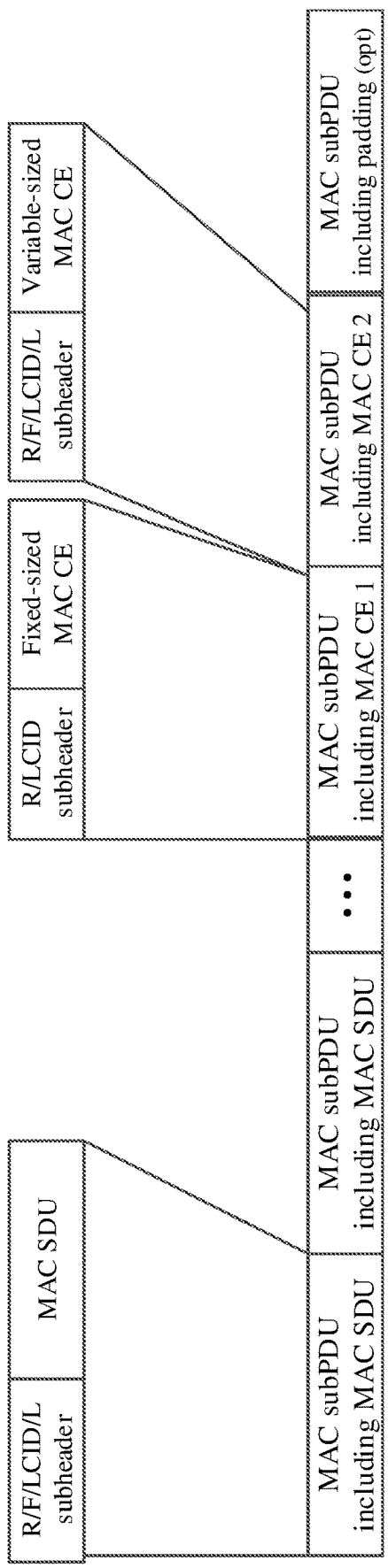
FIG. 5 is a schematic diagram showing a MAC PDU according to an exemplary embodiment of the present disclosure.

Reference may be made to FIG. 5, which illustrates a schematic diagram showing a MAC PDU. The MAC PDU is a data entity that is delivered from the MAC layer to the physical layer. Since the MAC PDU includes a plurality of sub PDUs each corresponding to a logical channel priority, a logical channel priority of the MAC PDU is a highest logical channel priority among logical channel priorities of sub PDUs of data carried in the MAC PDU.

For example, in a MAC PDU, when logical channel priorities of all sub PDUs include Priority 1, Priority 2, and Priority 3, the logical channel priority of the MAC PDU is Priority 1.

The logical channel priority determines a behavior of the MAC layer when processing a MAC PDU, i.e., when time frequency positions of two MAC PDUs overlap with each other, whether the MAC layer needs to deliver any of the two MAC PDUs to the physical layer. When the MAC layer needs to deliver one of the two MAC PDUs to the physical layer, the one MAC PDU is determined as a prioritized MAC PDU; otherwise the one MAC PDU is determined as a de-prioritized MAC PDU.

Optionally, a priority of the physical layer is a physical layer priority, which is given when the network device configures a semi-persistent configured grant using RRC signaling or schedules a dynamic grant using DCI. In an exemplary example, the physical layer priority includes two levels, i.e., Priority 1 and Priority 0, which correspond to data of two types of services: Ultra-Reliable Low Latency Communications (URLLC) and Enhanced Mobile Broadband (eMBB), respectively.

eMMB is a type of 5G service dedicated to mobile devices such as a cell phone, and URLLC will mainly be used for industrial applications and autonomous vehicles. Normally, URLLC services require ultra-high reliability and ultra-low latency, while eMBB services require a high rate, but not ultra-low latency and an ultra-low error rate. Therefore, the physical layer priority of data of the service type of URLLC is higher. When time frequency domain resources of air interfaces of eMMB and URLLC conflict with each other, transmission of the URLLC service is guaranteed with a higher priority to improve the reliability of URLLC transmission.

The physical layer priority determines a behavior at the physical layer, i.e., when time frequency positions of two MAC PDUs overlap with each other, whether the physical layer transmits any of the two MAC PDUs. When the physical layer transmits one of the two MAC PDUs, the one MAC PDU is determined as a prioritized MAC PDU; otherwise the one MAC PDU is determined as a de-prioritized MAC PDU.

Data determined as prioritized data by the MAC layer may be determined as de-prioritized data at the physical layer. In this case, the data is not transmitted. Therefore, the physical layer delivers the indication information to the MAC layer to notify the MAC layer that the data is not transmitted by the physical layer and that a priority of the data needs to be adjusted.

An SR determined as a prioritized SR by the MAC layer may be determined as a de-prioritized SR at the physical layer. In this case, the SR is not transmitted. Therefore, the physical layer delivers the indication information to the MAC layer to notify the MAC layer that the SR is not transmitted by the physical layer and that a priority of the SR needs to be adjusted.

Exemplarily, Data 1 is determined as prioritized data at the MAC layer based on a logical channel priority. However, at the physical layer, since time domain positions of Data 1 and Data 2 overlap with each other and Data 2 has a higher physical layer priority, the physical layer determines Data 1 as de-prioritized data and transmits Data 2 instead of Data 1. The physical layer delivers the indication information to the MAC layer to notify the MAC layer that Data 1 has not been successfully transmitted and that a priority of Data 1 needs to be adjusted.

After receiving the indication information, the MAC layer may implement actions at blocks 420a to 440a, or actions at blocks 420b to 440b.

At block 420a, the MAC layer adjusts, based on the indication information, a priority of data at the MAC layer from prioritized to de-prioritized.

The MAC layer adjusts, based on the indication information delivered by the physical layer, the priority of the data at the MAC layer from prioritized to de-prioritized. Optionally, when the indication information is not received by the MAC layer, the data originally determined as prioritized data by the MAC layer is transmitted at the physical layer. Optionally, the MAC layer determines, based on feedback information from the network device, whether the data is successfully transmitted.

At block 430a, the terminal device re-transmits the data.

After the priority of the data is adjusted to be de-prioritized at the MAC layer, the terminal device re-transmits the data to the network device.

At block 440*a*, the network device receives the data transmitted by the terminal device.

Optionally, the network device provides, by using DCI carried on the PDCCH, the terminal device with feedback on whether the data has been successfully received.

At block 420*b*, the MAC layer adjusts, based on the indication information, a priority of an SR at the MAC layer from prioritized to de-prioritized.

The SR, which is piggybacked on a Physical Uplink Control Channel (PUCCH) and occurs periodically, is indication information requesting the network device to transmit a Physical Uplink Shared Channel (PUSCH) resource to the terminal device. PUSCH data cannot be transmitted while the SR is being transmitted; and the SR cannot be transmitted while the PUSCH data is being transmitted.

The MAC layer adjusts, based on the indication information delivered by the physical layer, the priority of the SR at the MAC layer from prioritized to de-prioritized. Optionally, when the indication information is not received by the MAC layer, the SR originally determined as a prioritized SR by the MAC layer is transmitted at the physical layer.

At block 430*b*, the terminal device re-transmits the SR.

After the SR is adjusted to be de-prioritized at the MAC layer, the terminal device re-transmits the SR, and the MAC layer instructs the physical layer to transmit the SR to the network device.

At block 440*b*, the network device receives the SR transmitted by the terminal device.

Optionally, the network device transmits, in response to successfully receiving the SR, a UL grant to the terminal device.

In summary, with the method according to an embodiment, in a case where the MAC layer and the physical layer have inconsistent prioritizations, the indication information delivered from the physical layer to the MAC layer allows data (or an SR) that is not actually transmitted at the physical layer to be re-determined, by the MAC layer, as de-prioritized data (or a de-prioritized SR), so as to obtain a transmission opportunity for re-transmitting the data (or SR).

In an optional embodiment based on FIG. 4, the MAC layer may perform, based on the indication information, a priority adjustment for any of the following cases.

Case 1: the data includes a MAC PDU corresponding to a configured grant.

The configured grant is a grant pre-configured, by the network device by means of semi-persistent resource allocation, for a resource required by the terminal device for uplink transmission.

Case 2: the data includes a MAC PDU corresponding to a dynamic grant.

Case 3: the SR.

For the above Case 1 and Case 2, the operation of re-transmitting the data may include: receiving, by the MAC layer, a UL grant, and re-transmitting the MAC PDU based on the UL grant.

Optionally, the MAC layer may receive a further UL grant. The further UL grant has a same HARQ process number as the original UL grant of the MAC PDU. The MAC layer re-transmits the MAC PDU based on the received UL grant.

Figure 6:
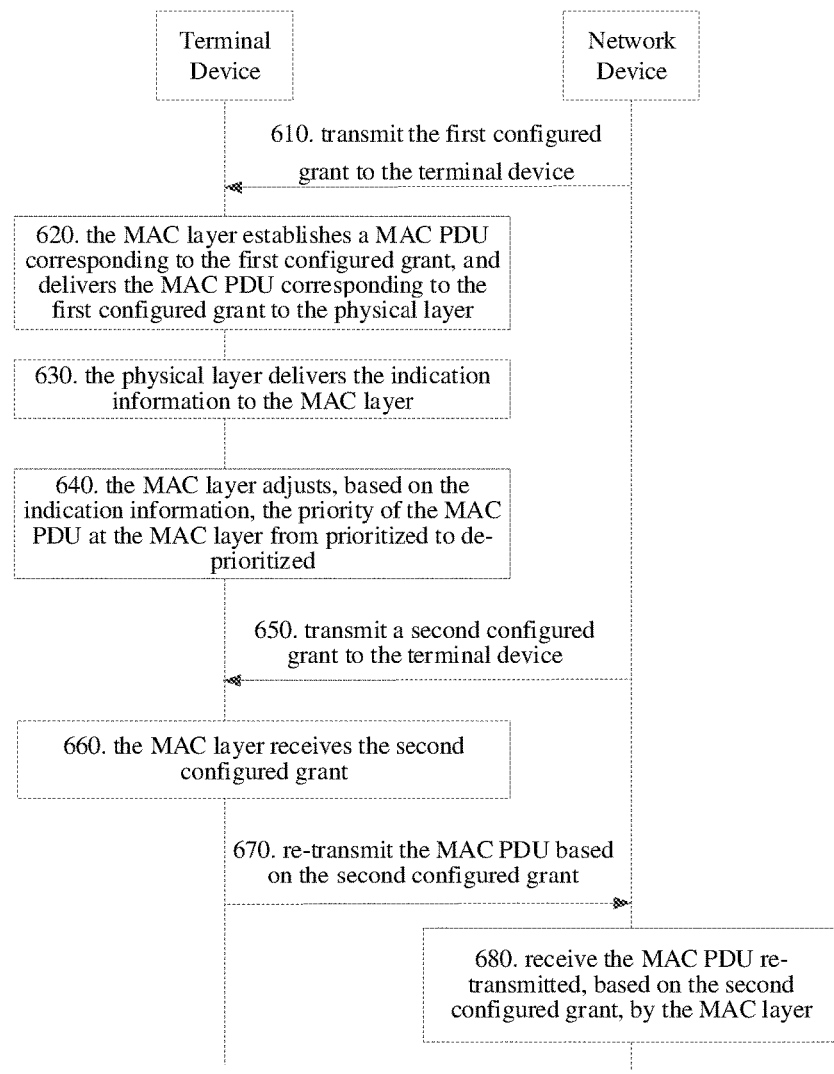
FIG. 6 is a flowchart illustrating a data transmission method according to an exemplary embodiment of the present disclosure.

For Case 1:

FIG. 6 illustrates a flowchart illustrating a data transmission method according to an exemplary embodiment of the present disclosure. The method may be applied in the terminal device and the network device that are illustrated in FIG. 2. The terminal device includes a MAC layer and a physical layer. In an embodiment, a MAC PDU corresponds to a first configured grant. The method includes actions at blocks 610 to 680.

At block 610, the network device transmits the first configured grant to the terminal device.

At block 620, the MAC layer establishes a MAC PDU corresponding to the first configured grant, and delivers the MAC PDU corresponding to the first configured grant to the physical layer.

Optionally, the MAC layer confirms that there is data to be transmitted on the first configured grant, establishes the MAC PDU, delivers the MAC PDU to the physical layer, and determines, based on a logical channel priority, that a priority of the MAC PDU is prioritized.

At block 630, the physical layer delivers indication information to the MAC layer.

The indication information indicates that the MAC PDU is not transmitted by the physical layer and that the MAC layer needs to adjust a priority of the MAC PDU.

At block 640, the MAC layer adjusts, based on the indication information, the priority of the MAC PDU at the MAC layer from prioritized to de-prioritized.

The MAC layer adjusts a priority of the first configured grant to de-prioritized based on the indication information. Accordingly, the priority of the MAC PDU is determined by the MAC layer to be de-prioritized.

In an implementation, the indication information includes exception indication information indicating that the physical layer and the MAC layer have opposite prioritizations. The physical layer delivers the exception indication information to the physical layer. The MAC layer may determine, in response to receiving the exception indication information, that the MAC PDU it determines to be prioritized is not transmitted by the physical layer, and the priority of the MAC PDU needs to be adjusted.

In another implementation, the indication information includes information corresponding to the MAC PDU. The physical layer delivers the information corresponding to the MAC PDU to the physical layer. The MAC layer may determine, in response to receiving the information corresponding to the MAC PDU, that the MAC PDU indicated in the information is not transmitted by the physical layer and the priority of the MAC PDU needs to be adjusted.

The information corresponding to the MAC PDU may include, but not limited to, at least one of: uplink grant information corresponding to the MAC PDU, logical channel priority information of the MAC PDU, priority indication information of the MAC PDU, or time frequency resource information configured for the MAC PDU. The present disclosure is not limited to any of these examples.

Optionally, the MAC layer transmitting the MAC PDU using an autonomous transmission mechanism may specifically include: the MAC layer transmitting, in response to arrival of a subsequent UL grant having a same HARQ process number as the first configured grant, the subsequent UL grant for data transmission.

Here, the HARQ process number, also referred to as an HARQ process ID, is used to uniquely designate a HARQ process.

At block 650, the network device transmits a second configured grant to the terminal device.

The second configured grant is an UL grant transmitted by the network device based on a configured scheduling mechanism. Optionally, the second configured grant has the same HARQ process number as the first configured grant.

At block 660, the MAC layer receives the second configured grant.

At block 670, the MAC layer re-transmits the MAC PDU based on the second configured grant.

The MAC layer delivers the MAC PDU to the physical layer. The physical layer transmits the MAC PDU to the network device by using an uplink resource indicated by the second configured grant.

At block 680, the network device receives the MAC PDU re-transmitted, based on the second configured grant, by the MAC layer.

Optionally, in a case of correct reception, the network device provides no feedback; and in a case of incorrect reception, the network device transmits DCI scrambled with the CS-RNTI, and the terminal device re-transmits the MAC PDU after receiving the DCI.

Figure 7:
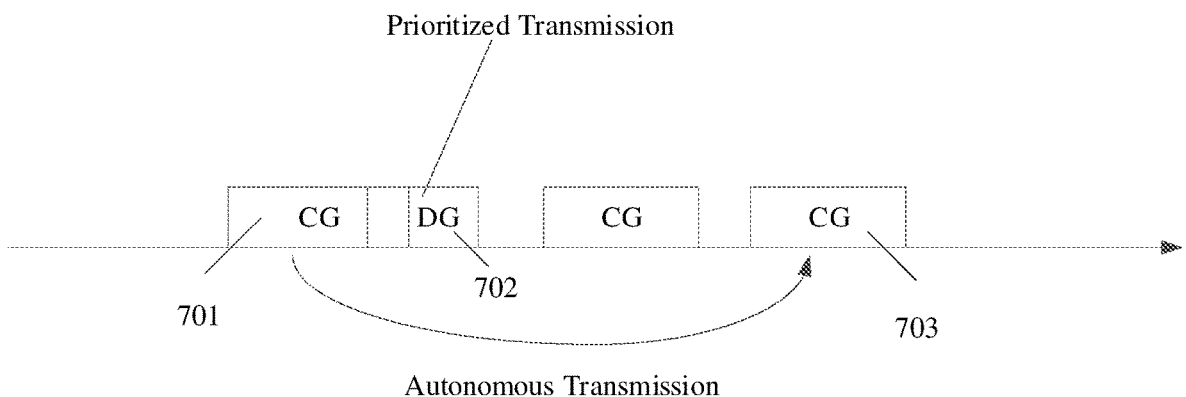
FIG. 7 is a schematic diagram showing a data transmission method according to an exemplary embodiment of the present disclosure.

Exemplarily, with reference to FIG. 7, there may be a semi-persistent configured grant (CG) 701 and a dynamic grant (DG) 702. The configured grant 701 corresponds to a high physical layer priority and a high logical channel priority. The dynamic grant 702 corresponds to a high physical layer priority and a low logical channel priority. The configured grant 701 and the dynamic grant 702 overlap with each other in time and frequency domains.

After receiving the configured grant 701 from the network device, the MAC layer is not sure whether there is data to be transmitted on the configured grant 701. Therefore, the MAC layer first establishes a MAC PDU corresponding to the dynamic grant 702 and transmit the MAC PDU to the physical layer.

Subsequently, the MAC layer confirms that there is data to be transmitted on the configured grant 701 at an upper layer. After the MAC PDU is established, the MAC layer finds that a de-prioritization process cannot be performed as the MAC PDU corresponding to the configured grant 701 includes logical channel data having a high logical channel priority, and therefore transmits the MAC PDU to the physical layer.

In a case where the physical layer finds that the physical layer priority of the configured grant 701 is identical to that of the dynamic grant 702, the MAC PDU corresponding to the dynamic grant 702 needs to be actually transmitted. In addition, when data transmission of the dynamic grant 702 has already started, the data transmission cannot be interrupted. The physical layer transmits the indication information to the MAC layer to inform the MAC layer that the MAC PDU on the configured grant 701 has not been transmitted (determined to be de-prioritized by the physical layer).

After receiving the indication information, the MAC layer considers the HARQ process/MAC PDU corresponding to configured grant 701 to be de-prioritized, and applies the autonomous transmission mechanism to re-transmit the MAC PDU by using a configured grant 703 having the same HARQ process number as the configured grant 701.

In summary, with the method provided by this embodiment, when the MAC PDU is piggybacked on the first configured grant, and the MAC PDU is not actually transmitted at the physical layer, the indication information delivered from the physical layer to the MAC layer causes the MAC layer to use the autonomous transmission mechanism to receive the second configured grant having the same HARQ process number as the first configured grant, and perform data transmission based on the second configured grant.

With the method provided by this embodiment, when the data is a MAC PDU, the terminal device may notify, based on the exception indication information or the information corresponding to the MAC PDU, the MAC layer of the un-transmitted MAC PDU. Therefore, flexibility of the data transmission method can be improved.

Figure 8:
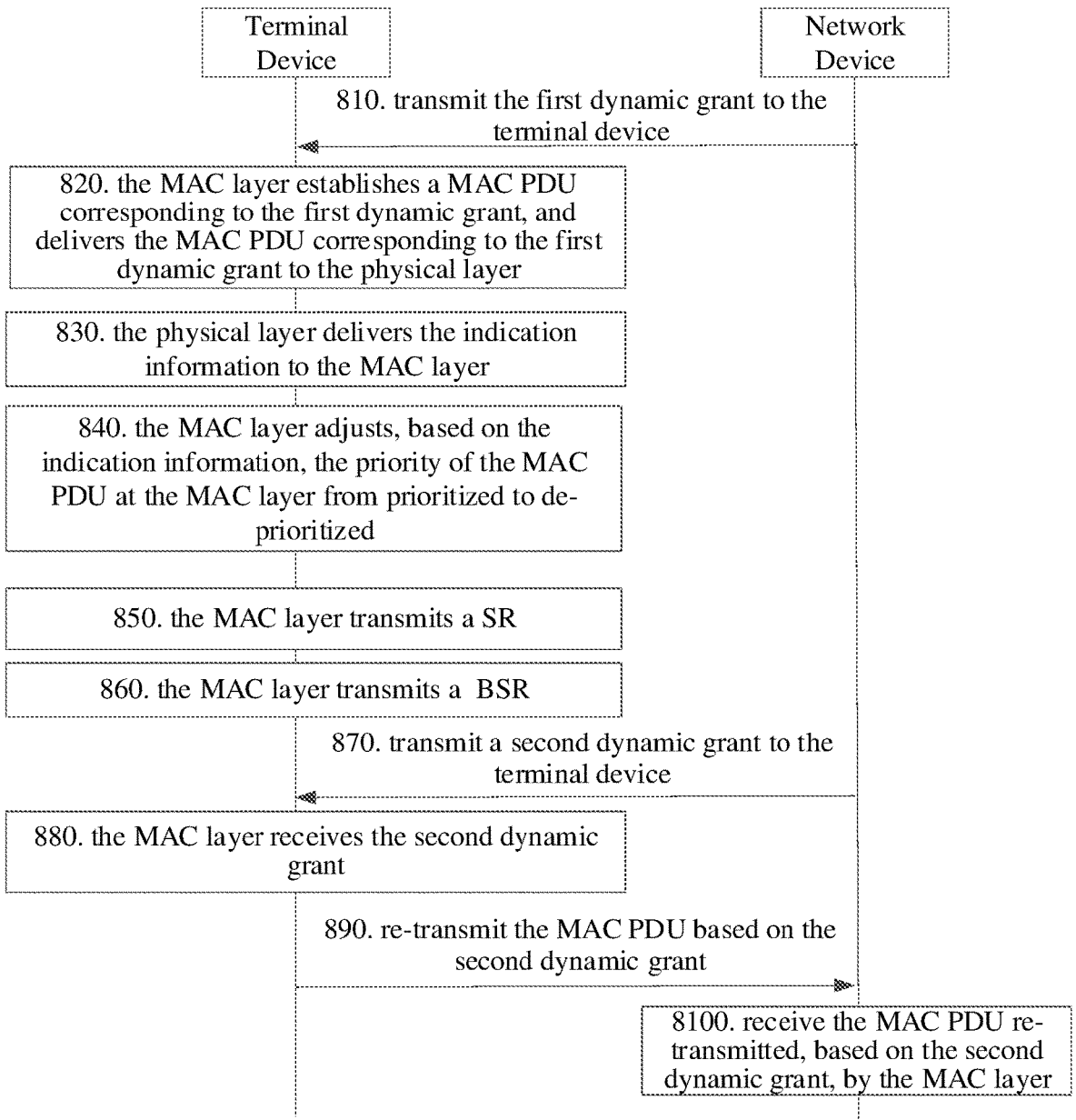
FIG. 8 is a flowchart illustrating a data transmission method according to an exemplary embodiment of the present disclosure.

For Case 2:

FIG. 8 illustrates a flowchart illustrating a data transmission method according to an exemplary embodiment of the present disclosure. The method may be applied in the terminal device and the network device that are illustrated in FIG. 2. The terminal device includes a MAC layer and a physical layer. In an embodiment, a MAC PDU corresponds to a first dynamic grant. The method includes actions at blocks 810 to 8100.

At block 810, the network device transmits the first dynamic grant to the terminal device.

At block 820, the MAC layer establishes a MAC PDU corresponding to the first dynamic grant, and delivers the MAC PDU corresponding to the first dynamic grant to the physical layer.

At block 830, the physical layer delivers indication information to the MAC layer.

The indication information indicates that the MAC PDU is not transmitted by the physical layer and that the MAC layer needs to adjust the priority of the MAC PDU.

In an implementation, the indication information includes exception indication information indicating that the physical layer and the MAC layer have opposite prioritizations. The physical layer delivers the exception indication information to the physical layer. The MAC layer may determine, in response to receiving the exception indication information, that the MAC PDU it determines to be prioritized is not transmitted by the physical layer, and the priority of the MAC PDU needs to be adjusted.

In another implementation, the indication information includes information corresponding to the MAC PDU. The physical layer delivers the information corresponding to the MAC PDU to the physical layer. The MAC layer may determine, in response to receiving the information corresponding to the MAC PDU, that the MAC PDU indicated in the information is not transmitted by the physical layer and the priority of the MAC PDU needs to be adjusted.

The information corresponding to the MAC PDU may include, but not limited to, at least one of: uplink grant information corresponding to the MAC PDU, logical channel priority information of the MAC PDU, priority indication information of the MAC PDU, or time frequency resource information configured for the MAC PDU. The present disclosure is not limited to any of these examples.

At block 840, the MAC layer adjusts, based on the indication information, the priority of the MAC PDU at the MAC layer from prioritized to de-prioritized.

The MAC layer adjusts a priority of the first dynamic grant to de-prioritized based on the indication information. Accordingly, the priority of the MAC PDU is considered by the MAC layer to be de-prioritized.

At block 850, the MAC layer transmits an SR.

The SR is used for the terminal device to request an uplink resource, i.e., a PUSCH resource, from the network device.

Optionally, the MAC layer transmits, after receiving the indication information, the SR to request the PUSCH resource when no PUSCH resource is available.

At block 860, the MAC layer transmits a BSR.

To obtain an uplink resource, the terminal device needs to transmit the BSR to inform the network device of a buffer status, such that the network device may allocate the uplink resource based on the buffer status.

At block 870, the network device transmits a second dynamic grant to the terminal device.

Optionally, the second dynamic grant has a same HARQ process number as the first dynamic grant.

At block 880, the MAC layer receives the second dynamic grant.

At block 890, the MAC layer re-transmits the MAC PDU based on the second dynamic grant.

The MAC layer delivers the MAC PDU to the physical layer. The physical layer transmits the MAC PDU to the network device by using the uplink resource indicated by the second dynamic grant.

At block 8100, the network device receives the MAC PDU re-transmitted, based on the second dynamic grant, by the MAC layer.

Optionally, the network device transmits the DCI scrambled with the C-RNTI for feedback on this transmission. The DCI includes an ACK in a case of correct reception and an NACK in a case of incorrect reception. The terminal device re-transmits, after receiving the DCI, the MAC PDU by using a time frequency domain resource given in the DCI.

In summary, with the method provided by the embodiment, when the MAC PDU is piggybacked on the first dynamic grant and the MAC PDU is not actually transmitted at the physical layer, the MAC layer obtains, based on the indication information delivered from the physical layer to the MAC layer, the second dynamic grant when no PUSCH resource is available, and perform data transmission based on the second dynamic grant.

With the method provided by the embodiment, when the data is the MAC PDU, the terminal device may notify, based on the exception indication information or the information corresponding to the MAC PDU, the MAC layer of the un-transmitted MAC PDU. Therefore, the flexibility of the data transmission method can be improved.

Figure 9:
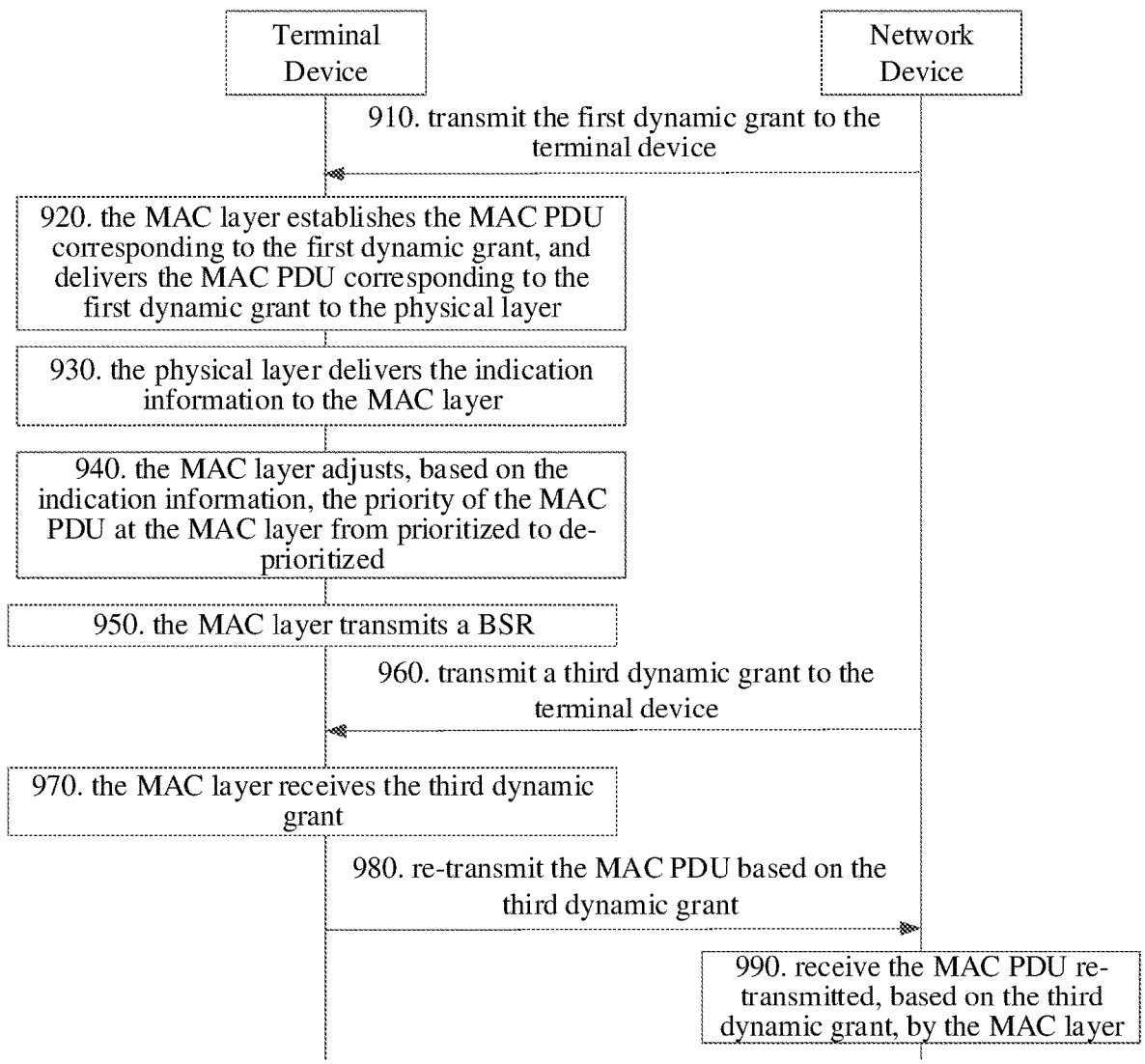
FIG. 9 is a flowchart illustrating a data transmission method according to an exemplary embodiment of the present disclosure.

FIG. 9 is a flowchart illustrating a data transmission method according to an exemplary embodiment of the present disclosure. The method may be applied in the terminal device and the network device that are illustrated in FIG. 2. The terminal device includes a MAC layer and a physical layer. In an embodiment, a MAC PDU corresponds to a first dynamic grant. The method includes actions at blocks 910 to 990.

At block 910, the network device transmits the first dynamic grant to the terminal device.

At block 920, the MAC layer establishes a MAC PDU corresponding to the first dynamic grant, and delivers the MAC PDU corresponding to the first dynamic grant to the physical layer.

At block 930, the physical layer delivers indication information to the MAC layer.

The indication information indicates that the MAC PDU is not transmitted by the physical layer and that the MAC layer needs to adjust a priority of the MAC PDU.

In an implementation, the indication information includes exception indication information indicating that the physical layer and the MAC layer have opposite prioritizations. The physical layer delivers the exception indication information to the physical layer. The MAC layer may determine, in response to receiving the exception indication information, that the MAC PDU it determines to be prioritized is not transmitted by the physical layer, and the priority of the MAC PDU needs to be adjusted.

In another implementation, the indication information includes information corresponding to the MAC PDU. The physical layer delivers the information corresponding to the MAC PDU to the physical layer. The MAC layer may determine, in response to receiving the information corresponding to the MAC PDU, that the MAC PDU indicated in the information is not transmitted by the physical layer and the priority of the MAC PDU needs to be adjusted.

The information corresponding to the MAC PDU includes, but is not limited to, at least one of: uplink grant information corresponding to the MAC PDU, logical channel priority information of the MAC PDU, priority indication information of the MAC PDU, or time frequency resource information configured for the MAC PDU. The present disclosure is not limited to any of these examples.

At block 940, the MAC layer adjusts, based on the indication information, the priority of the MAC PDU at the MAC layer from prioritized to de-prioritized.

The MAC layer adjusts the priority of the first dynamic grant to de-prioritized based on the indication information. Accordingly, the priority of the MAC PDU is determined by the MAC layer to be de-prioritized.

At block 950, the MAC layer transmits a BSR.

Optionally, after receiving the indication information, the MAC layer transmits the BSR to the network device when a PUSCH resource is available. The BSR is used to inform the network device of a buffer status. Therefore, the network device may allocate an uplink resource based on the buffer status.

At block 960, the network device transmits a third dynamic grant to the terminal device.

Optionally, the third dynamic grant has a same HARQ process number as the first dynamic grant.

At block 970, the MAC layer receives the third dynamic grant.

At block 980, the MAC layer re-transmits the MAC PDU based on the third dynamic grant.

The MAC layer delivers the MAC PDU to the physical layer. The physical layer transmits the MAC PDU to the network device by using the uplink resource indicated by the third dynamic grant.

At block 990, the network device receives the MAC PDU re-transmitted, based on the third dynamic grant, by the MAC layer.

Optionally, the network device transmits DCI scrambled with a C-RNTI for feedback on this transmission. The DCI includes an ACK in a case of correct reception and an NACK in a case of incorrect reception. The terminal device re-transmits, after receiving the DCI, the MAC PDU by using a time frequency domain resource given in the DCI.

Figure 10:
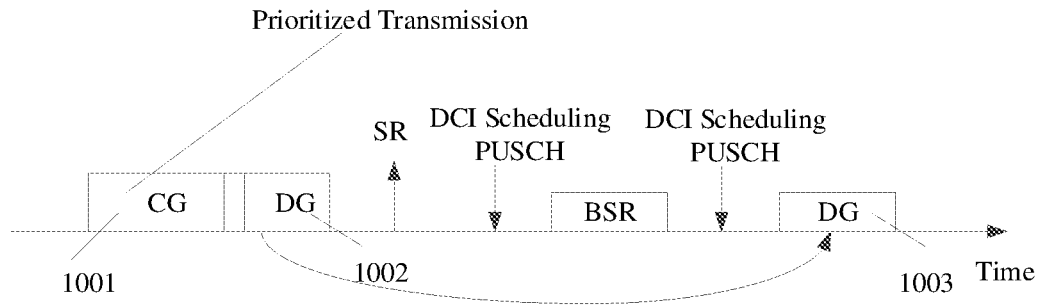
FIG. 10 is a schematic diagram showing a data transmission method according to an exemplary embodiment of the present disclosure.

Exemplarily, with reference to FIG. 10, there is a semi-persistent configured grant (CG) 1001 and a dynamic grant (DG) 1002. The configured grant 1001 corresponds to a high physical layer priority and a high logical channel priority. The dynamic grant 1002 corresponds to a low physical layer priority and a low logical channel priority. The configured grant 1001 and the dynamic grant 1002 overlap with each other in time and frequency domains.

After receiving the dynamic grant 1002 from the network device, the MAC layer is not sure whether there is data to be transmitted on the configured grant 1001. Therefore, the MAC layer first establishes a MAC PDU corresponding to the dynamic grant 1002 and transmit the MAC PDU to the physical layer.

Subsequently, the MAC layer confirms that there is data to be transmitted on the configured grant 1001 at an upper layer. After the MAC PDU is established, the MAC layer finds that a deprioritization process cannot be performed as the MAC PDU corresponding to the configured grant 1001 includes logical channel data having a high logical channel priority, and therefore transmits the MAC PDU to the physical layer.

In a case where the physical layer finds that a physical layer priority of the configured grant 1001 is higher than that of the dynamic grant 1002, the MAC PDU corresponding to the configured grant 1001 needs to be actually transmitted (when data transmission corresponding to the dynamic grant 1002 has already started, the data transmission can be interrupted). The physical layer transmits indication information to the MAC layer to inform the MAC layer that the MAC PDU on the dynamic grant 1002 has not been successfully transmitted (determined to be de-prioritized by the physical layer).

After receiving the indication information, the MAC layer may determine a priority of the HARQ process/MAC PDU corresponding to dynamic grant 1002 to be de-prioritized, and apply the SR (when there is no available PUSCH resource) or directly transmit a BSR (when there is an available PUSCH resource) to the network device. The network device schedules a new dynamic grant 1003 using DCI for the MAC PDU. The terminal device re-transmits the MAC PDU by using the dynamic grant 1003 having the same HARQ process number as the dynamic grant 1002.

In summary, with the method provided by this embodiment, when the MAC PDU is piggybacked on the first dynamic grant, and the MAC PDU is not actually transmitted at the physical layer, the MAC layer obtains, based on the indication information delivered from the physical layer to the MAC layer, the third dynamic grant when a PUSCH resource is available, and achieves data transmission with the third dynamic grant.

With the method provided by this embodiment, when the data is a MAC PDU, the terminal device may notify, based on the exception indication information or the information corresponding to the MAC PDU, the MAC layer of the un-transmitted MAC PDU. Therefore, the flexibility of the data transmission method can be improved.

Figure 11:
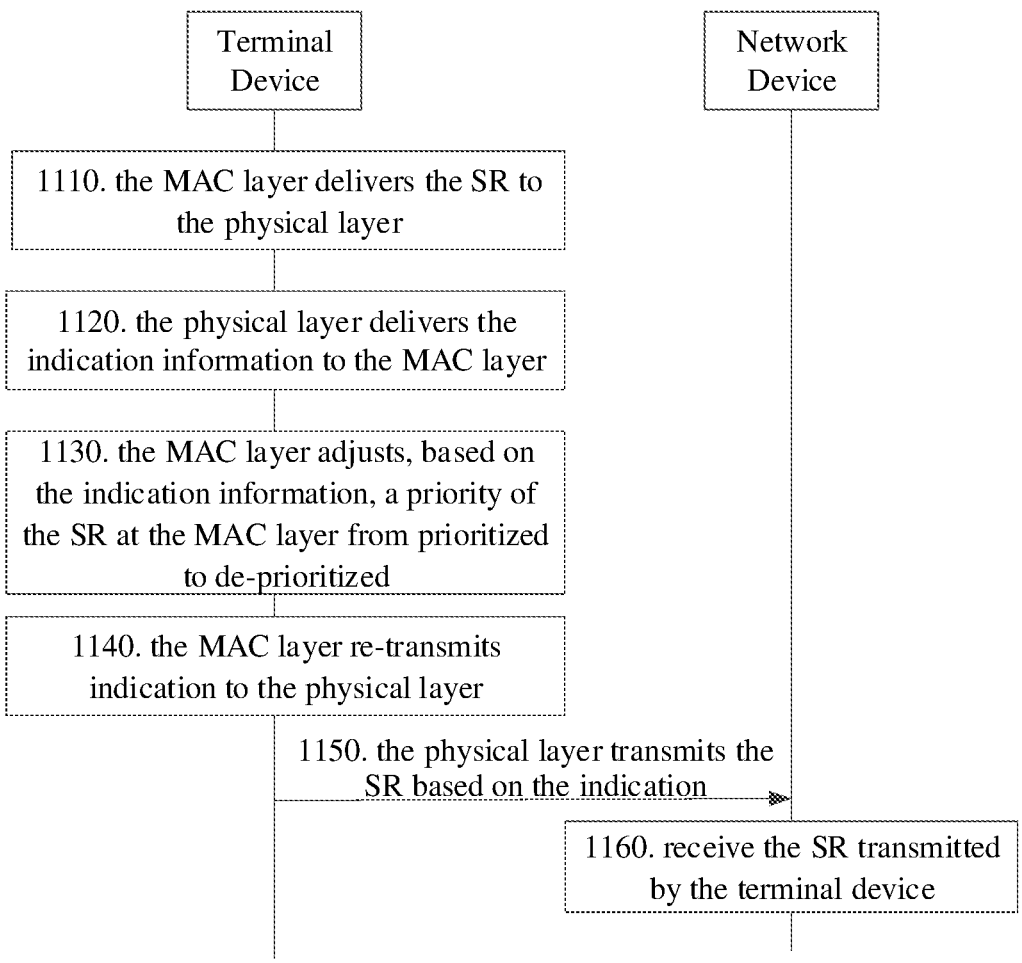
FIG. 11 is a flowchart illustrating a data transmission method according to an exemplary embodiment of the present disclosure.

For Case 3:

FIG. 11 illustrates a flowchart illustrating a data transmission method according to an exemplary embodiment of the present disclosure. The method may be applied in the terminal device and the network device that are illustrated in FIG. 2. The terminal device includes a MAC layer and a physical layer. The method includes actions at blocks 1110 to 1160.

At block 1110, the MAC layer delivers an SR to the physical layer.

At block 1120, the physical layer delivers indication information to the MAC layer.

The indication information indicates that the SR is not transmitted by the physical layer and the MAC layer needs to adjust a priority of the SR.

Exemplarily, in a case where the SR has a same logical channel priority and a same physical layer priority as a logical channel or logical channel group that triggers the SR and has new data to be transmitted, the physical layer prioritizes transmission of the data on the logical channel or logical channel group, and does not transmit the SR. Therefore, the physical layer delivers the indication information to the MAC layer.

At block 1130, the MAC layer adjusts, based on the indication information, a priority of the SR at the MAC layer from prioritized to de-prioritized.

The MAC layer adjusts, based on the indication information, the priority of the SR to de-prioritized to instruct the physical layer to re-transmit the SR.

At block 1140, the MAC layer re-transmits an indication to the physical layer.

After receiving the indication information, the MAC layer re-instructs the physical layer to transmit the SR.

At block 1150, the physical layer transmits the SR based on the indication.

In an implementation, the physical layer transmits the SR immediately upon receiving the indication. In another implementation, the physical layer re-transmits the SR after receiving the indication for a period of time (a time length of which is controlled by a timer). The timer is configured by the network device to the terminal device.

At block 1160, the network device receives the SR transmitted by the terminal device.

Optionally, the network device issues, in response to successfully receiving the SR, a UL grant to the terminal device.

Exemplarily, provided that the MAC layer has transmitted one MAC PDU to the physical layer, the MAC layer instructs the physical layer to transmit the SR. The logical channel priority corresponding to the logical channel that triggers the SR is higher than the logical channel priority of the MAC PDU.

The physical layer determines that in a time domain, a PUCCH of the SR associated with the logical channel overlaps with a time domain position of the MAC PDU. After querying the physical layer priority, the terminal device finds that the physical layer priority corresponding to the SR is lower than a physical layer priority corresponding to the MAC PDU. The physical layer determines to cancel transmission of the SR and transmits corresponding indication information to the MAC layer. The MAC layer re-instructs the physical layer to re-transmit the SR.

In summary, with the method according to this embodiment, in a case where the SR is not transmitted by the physical layer, the indication information delivered from the physical layer to the MAC layer causes the MAC layer to instruct the physical layer to re-transmit the SR, and achieve the transmission of the SR.

It is to be noted that the above embodiments can be implemented separately or in combination. Embodiments of the present disclosure are not limited in this regard.

It is to be noted that the steps corresponding to the terminal device side according to any of the above embodiments can be implemented independently and the steps corresponding to a network device side according to any of the above embodiments can be implemented independently.

Figure 12:
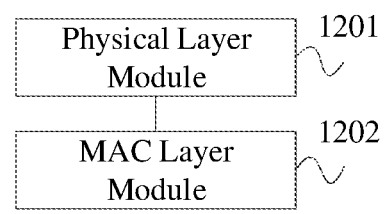
FIG. 12 is a block diagram showing a structure of a data transmission apparatus according to an exemplary embodiment of the present disclosure.

FIG. 12 illustrates a block diagram showing a structure of a data transmission apparatus according to an exemplary embodiment of the present disclosure. The apparatus may be implemented as a terminal device or as part of the terminal device. The apparatus includes a physical layer module 1201 and a MAC layer module 1202.

The physical layer module 1201 is configured to deliver indication information to the MAC layer module 1202.

The MAC layer module 1202 is configured to adjust, based on the indication information, a priority of data at the MAC layer module 1202 from prioritized to de-prioritized, and instruct the physical layer module 1201 to re-transmit the data; or the MAC layer module 1202 is configured to adjust, based on the indication information, a priority of an SR at the MAC layer module 1202 from prioritized to de-prioritized, and instruct the physical layer module 1201 to re-transmit the SR.

In an optional embodiment, the data includes a MAC PDU. The MAC layer module 1202 is configured to receive a UL grant, and re-transmit the MAC PDU based on the UL grant.

In an optional embodiment, the MAC PDU corresponds to a first configured grant. The MAC layer module 1202 is configured to: receive a second configured grant; and re-transmit, based on the second configured grant, the MAC PDU.

In an optional embodiment, the MAC PDU corresponds to a first dynamic grant. The MAC layer module 1202 is configured to: transmit the SR; transmit a BSR; receive a second dynamic grant; and re-transmit, based on the second dynamic grant, the MAC PDU.

In an optional embodiment, the MAC PDU corresponds to a first dynamic grant. The MAC layer module 1202 is configured to: transmit a BSR; receive a third dynamic grant; and re-transmit, based on the third dynamic grant, the MAC PDU.

In an optional embodiment, the MAC layer module 1202 is configured to re-transmit an indication to the physical layer; and the physical layer module 1201 is configured to transmit, based on the indication, the SR.

In an optional embodiment, the indication information includes exception indication information indicating that the physical layer and the MAC layer have opposite prioritizations; or the indication information includes information corresponding to the MAC PDU.

In an optional embodiment, the information corresponding to the MAC PDU includes at least one of: uplink grant information corresponding to the MAC PDU, logical channel priority information of the MAC PDU, priority indication information of the MAC PDU, or time frequency resource information configured for the MAC PDU.

In an optional embodiment, the physical layer module 1201 is configured to: deliver, in response to prioritized data determined by the MAC layer not being transmitted, the indication information to the MAC layer; and deliver, in response to a prioritized SR determined by the MAC layer not being transmitted, the indication information to the MAC layer.

Figure 13:
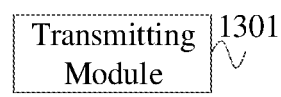
FIG. 13 is a block diagram showing a structure of a data transmission apparatus according to an exemplary embodiment of the present disclosure.

FIG. 13 illustrates a block diagram showing a structure of a data transmission apparatus according to an exemplary embodiment of the present disclosure. The apparatus can be implemented as the network device or part of the network device. The apparatus includes a transmission module 1301.

The transmission module 1301 is configured to: receive data transmitted by a terminal device; or receive an SR transmitted by the terminal device. Here, the terminal device includes a MAC layer and a physical layer. The data is transmitted by the MAC layer after adjusting, based on indication information, a priority of the data at the MAC layer from prioritized to de-prioritized. The SR is transmitted by the MAC layer after adjusting, based on the indication information, a priority of the SR at the MAC layer from prioritized to de-prioritized. The indication information is information delivered from the physical layer to the MAC layer.

In an optional embodiment, the data includes a MAC PDU. The transmission module 1301 is configured to: transmit a UL grant to the terminal device; and receive the MAC PDU transmitted, based on the UL grant, by the MAC layer.

In an optional embodiment, the MAC PDU corresponds to a first configured grant. The transmission module 1301 is configured to: transmit a second configured grant to the terminal device; and receive the MAC PDU re-transmitted, based on the second configured grant, by the MAC layer.

In an optional embodiment, the MAC PDU corresponds to a first dynamic grant. The transmission module 1301 is configured to: transmit, in response to receiving the SR and a BSR, a second dynamic grant to the terminal device; and receive the MAC PDU transmitted, based on the second dynamic grant, by the MAC layer.

In an optional embodiment, the MAC PDU corresponds to a first dynamic grant. The transmission module 1301 is configured to: transmit, in response to receiving a BSR, a third dynamic grant to the terminal device; and receive the MAC PDU transmitted, based on the third dynamic grant, by the MAC layer.

In an optional embodiment, the transmission module 1301 is configured to receive the SR transmitted by the physical layer. The SR is transmitted by the physical layer based on an indication re-transmitted by the MAC layer.

In an optional embodiment, the indication information includes exception indication information indicating that the physical layer and the MAC layer have opposite prioritizations; or the indication information includes information corresponding to the MAC PDU.

In an optional embodiment, the information corresponding to the MAC PDU includes at least one of: uplink grant information corresponding to the MAC PDU, logical channel priority information of the MAC PDU, priority indication information of the MAC PDU, or time frequency resource information configured for the MAC PDU.

In an optional embodiment, the indication information is information delivered by the physical layer to the MAC layer in response to prioritized data determined by the MAC layer not being transmitted; or the indication information is information delivered by the physical layer to the MAC layer in response to a prioritized SR determined by the MAC layer not being transmitted.

Figure 14:
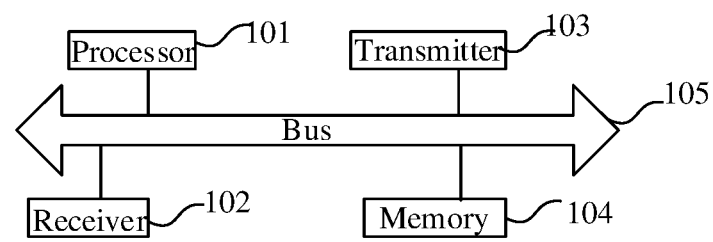
FIG. 14 is a schematic diagram showing a structure of a communication device according to an exemplary embodiment of the present disclosure.

FIG. 14 illustrates a schematic diagram showing a structure of a communication device (the terminal device or the network device) according to an exemplary embodiment of the present disclosure. The communication device includes a processor 101, a receiver 102, a transmitter 103, a memory 104, and a bus 105.

The processor 101 includes one or more processing cores. The processor 101 executes various functional applications and information processing by running software programs and modules.

The receiver 102 and the transmitter 103 can be implemented as one communication component. The communication component can be a communication chip.

The memory 104 is connected to the processor 101 through the bus 105.

The memory 104 can be used to store at least one instruction. The processor 101 is configured to execute the at least one instruction, so as to implement each operation in the above method embodiments.

In addition, the memory 104 may be implemented by any type of volatile or non-volatile storage device or a combination thereof. The volatile or non-volatile storage device includes, but is not limited to, a magnetic disk or an optical disc, an Electrically Erasable Programmable Read-Only Memory (EEPROM), an Erasable Programmable Read-Only Memory (EPROM), a Static Random Access Memory (SRAM), a Read-Only Memory (ROM), a magnetic memory, a flash memory, a Programmable Read-Only Memory (PROM).

In an exemplary embodiment, a computer-readable storage medium is further provided. At least one instruction, at least one segment of a program, a set of codes, or a set of instructions is stored on the computer-readable storage medium, and is loaded and executed by the processor to perform the data transmission method implemented by the communication device according to the method embodiments described above.

A person skilled in the art can understand that all or a part of the operations in the above embodiments can be implemented by hardware, or by relevant hardware instructed by a program. The program can be stored in a computer-readable storage medium. The above storage medium may be a read-only memory, a magnetic disk, an optical disc or the like.

The above are only optional embodiments of the present disclosure, and are not intended to limit the present disclosure. Any modification, equivalent replacement, improvement, etc., made within the spirit and principle of the present disclosure shall be included in the protection scope of the present disclosure.

What is claimed is:

1. A data transmission method, applied in a terminal device comprising a Medium Access Control (MAC) layer and a physical layer, the method comprising:
    delivering, by the physical layer, indication information to the MAC layer, the indication information notifying the MAC layer that one piece of data is not transmitted by the physical layer, the one piece of data being determined by the physical layer as de-prioritized data and being determined by the MAC layer as prioritized data, wherein said delivering, by the physical layer, the indication information to the MAC layer comprises delivering, by the physical layer in response to the one piece of data not being transmitted by the physical layer, the indication information to the MAC layer; and
    adjusting, by the MAC layer based on the indication information, a priority of the one piece of data at the MAC layer from prioritized to de-prioritized; and
    re-transmitting the one piece of data, by the physical layer, to a network device after the priority of the one piece of data at the MAC layer being adjusted from prioritized to de-prioritized.

2. The method according to claim 1, wherein the one piece of data comprises a MAC Protocol Data Unit (PDU); and
    wherein said re-transmitting the one piece of data comprises:
        receiving, by the MAC layer, an Uplink (UL) grant, and re-transmitting the MAC PDU based on the UL grant.

3. The method according to claim 2, wherein the MAC PDU corresponds to a first configured grant; and
    wherein said receiving, by the MAC layer, the UL grant, and re-transmitting the MAC PDU based on the UL grant comprises:
        receiving, by the MAC layer, a second configured grant; and
        re-transmitting, by the MAC layer based on the second configured grant, the MAC PDU.

4. A data transmission method, applied in a network device, the method comprising:
    receiving one piece of data transmitted by a terminal device,
    wherein the terminal device comprises a Medium Access Control (MAC) layer and a physical layer, the one piece of data is determined by the physical layer as de-prioritized data and determined by the MAC layer as prioritized data, wherein the MAC layer adjusts, based on indication information, a priority of the one piece of data at the MAC layer from prioritized to de-prioritized, and the one piece of data is re-transmitted by the physical layer to the network device after the priority of the one piece of data at the MAC layer being adjusted from prioritized to de-prioritized, the indication information being information delivered from the physical layer to the MAC layer in response to the one piece of data not being transmitted by the physical layer and indicating the MAC layer to adjust the priority of the one piece of data at the MAC layer.

5. The method according to claim 4, wherein the one piece of data comprises a MAC Protocol Data Unit (PDU); and
    wherein said receiving the one piece of data transmitted by the terminal device comprises:
        transmitting an Uplink (UL) grant to the terminal device; and
        receiving the MAC PDU transmitted, based on the UL grant, by the MAC layer.

6. The method according to claim 5, wherein the MAC PDU corresponds to a first configured grant;
    wherein said transmitting the UL grant to the terminal device comprises:
        transmitting a second configured grant to the terminal device; and
    wherein said receiving the MAC PDU transmitted, based on the UL grant, by the MAC layer comprises:
        receiving the MAC PDU re-transmitted, based on the second configured grant, by the MAC layer.

7. A terminal device, comprising:
    a processor;
    a transceiver connected to the processor; and
    a memory configured to store instructions executable by the processor;
    wherein the terminal device comprises a Medium Access Control (MAC) layer and a physical layer, and
    wherein the processor is configured to load and execute the executable instructions to cause the terminal device to:
        deliver, by the physical layer, indication information to the MAC layer, the indication information notifying the MAC layer that one piece of data is not transmitted by the physical layer, the one piece of data being determined by the physical layer as de-prioritized data and being determined by the MAC layer as prioritized data, wherein said delivering, by the physical layer, the indication information to the MAC layer comprises delivering, by the physical layer in response to the one piece of data not being transmitted by the physical layer, the indication information to the MAC layer; and
        adjust, by the MAC layer based on the indication information, a priority of the one piece of data at the MAC layer from prioritized to de-prioritized; and
        re-transmit the one piece of data, by the physical layer, to a network device after the priority of the one piece of data at the MAC layer being adjusted from prioritized to de-prioritized.

8. The terminal device according to claim 7, wherein the one piece of data comprises a MAC Protocol Data Unit (PDU); and
    wherein said re-transmitting the one piece of data comprises:
        receiving, by the MAC layer, an Uplink (UL) grant, and re-transmitting the MAC PDU based on the UL grant.

9. The terminal device according to claim 8, wherein the MAC PDU corresponds to a first configured grant; and
    wherein said receiving, by the MAC layer, the UL grant, and re-transmitting the MAC PDU based on the UL grant comprises:

receiving, by the MAC layer, a second configured grant; and re-transmitting, by the MAC layer based on the second configured grant, the MAC PDU.

10. A network device, comprising:
a processor;
a transceiver connected to the processor; and
a memory configured to store instructions executable by the processor;
wherein the processor is configured to load and execute the executable instructions to implement the data transmission method according to claim 4.

11. The network device according to claim 10, wherein the one piece of data comprises a MAC Protocol Data Unit (PDU); and
wherein said receiving the one piece of data transmitted by the terminal device comprises:
transmitting an Uplink (UL) grant to the terminal device; and
receiving the MAC PDU transmitted, based on the UL grant, by the MAC layer.

12. The network device according to claim 11, wherein the MAC PDU corresponds to a first configured grant;
wherein said transmitting the UL grant to the terminal device comprises:
transmitting a second configured grant to the terminal device; and
wherein said receiving the MAC PDU transmitted, based on the UL grant, by the MAC layer comprises:
receiving the MAC PDU re-transmitted, based on the second configured grant, by the MAC layer.

13. A non-transitory computer-readable storage medium, having executable instructions stored thereon, wherein the executable instructions are loaded and executed by a processor to implement the data transmission method according to claim 1.

14. A non-transitory computer-readable storage medium, having executable instructions stored thereon, wherein the executable instructions are loaded and executed by a processor to implement the data transmission method according to claim 4.

* * * * *